United States Patent Office 2,814,605
Patented Nov. 26, 1957

2,814,605

PROCESSING OF POLYURETHANE POLYMERS

Frederic B. Stilmar, Wilmington, Del., assignor to E. I. du Pont de Nemours and Company, Wilmington, Del., a corporation of Delaware No Drawing. Application May 31, 1955,
Serial No. 512,279

8 Claims. (Cl. 260—42)

This invention relates to the preparation of polyurethane elastomers and more particularly to the processing of these elastomers.

Curable elastomers having valuable properties may be prepared by reacting a long-chain polyalkylene ether glycol with a molar excess of an organic diisocyanate to form a linear polymer containing urethane linkages, and then reacting this polymer with a chain-extending agent containing a plurality of active hydrogen atoms, such as water, a diamine, a hydroxyamine, and the like, as disclosed and claimed in copending application Serial No. 365,270 of Hill, filed June 30, 1953. Similar products are obtained by reacting together a high molecular weight organic bischloroformate, an organic diamine and phosgene, as described in copending application Serial No. 461,657 of Carter and Ernsberger, filed October 11, 1954.

Products of this type may be cured by heating, ordinarily under pressure, if the reaction product contains free isocyanate groups. Under these conditions, the free isocyanate groups are believed to react with active hydrogen atoms in the polymer to produce cross-linking of the polymer chains. If the proportion of reactants has been such that few free isocyanate groups are present, or if the uncured reaction product has been stabilized against premature curing by the addition of some material such as a primary or secondary amine which reacts with and ties up the free isocyanate groups, it is necessary to add a curing agent prior to heating to effect vulcanization. The curing agents ordinarily employed are diisocyanates. Many formulations of elastomers prepared by reacting polytetramethyleneether glycols with organic diisocyanates and then chain extending with compounds containing two active hydrogen atoms are difficult to process because they scorch at processing temperatures after the incorporation of a diisocyanate curing agent. While this is not true of all such formulations, it is sufficiently common to offer a distinct problem in the commercial processing of this type of rubber. When the elastomer formulation scorches, it is no longer processable into useful articles.

Many types of plasticizers have been used with other elastomers to reduce their viscosities and thus improve their processability. Various materials which act as retarders for the conventional curing agents used with other elastomers have not been effective with polyurethane elastomers.

It is an object of this invention to provide a method for processing polyurethane elastomers. A further object is to provide a plasticized polyurethane having improved scorch resistance. Other objects will appear hereinafter.

It has now been found that, according to the present invention, a stable uncured polyurethane polymer which is curable by heating with an organic polyisocyanate and which contains substantially no free isocyanate groups may be processed with reduced danger of scorching by incorporating therewith, prior to the addition of the polyisocyanate curing agent, from 3 to 40% by weight of a polyurethane plasticizer having hydroxyl end groups prepared by the reaction of a polytetramethyleneether glycol and 2,4-tolylene diisocyanate.

The polyurethane plasticizers of this invention are prepared by reacting together a polytetramethyleneether glycol of molecular weight at least 750 with 2,4-tolylene diisocyanate, there being at least one molecular proportion of the polytetramethyleneether glycol in excess of the diisocyanate. Since the reaction takes place slowly at room temperature, the reaction is preferably carried out by heating the two compounds together at about 50–130° C. It is convenient to use a temperature of about 100° C., since the reaction takes place completely in a relatively short time to yield a product having no free —NCO groups. The reaction between three mols of polytetramethyleneether glycol and two of diisocyanate may be written as follows:

3HO—G—OH + 2OCN—R—NCO ⟶

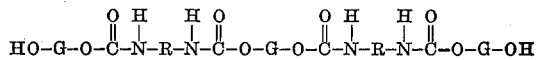

HO—G—O—C̈—N̈—R—N̈—C̈—O—G—O—C̈—N̈—R—N̈—C̈—O—G—OH wherein G represents the polytetramethyleneether glycol radical and R represents the nucleus of 2,4-tolylene diisocyanate.

A generalized formula for the polyurethane plasticizer of the present invention may be written as follows:

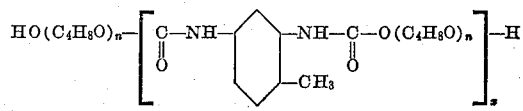

wherein $n$ is an integer corresponding to polytetramethyleneether glycol molecular weights of about 750 to 3,000 and $x$ is an integer from 1 to 19 corresponding to a polytetramethyleneether glycol/2,4-tolylene diisocyanate ratio range of 2:1 to 20:19.

The polyurethane plasticizer having ratios of polytetramethyleneether glycol to 2,4-tolylene diisocyanate between 2:1 and 20:19 are useful in the present invention. Higher molecular weight products do not give sufficient placticizing action to be useful since their viscosities approach that of the elastomer itself. It is necessary to have a molar ratio of polytetramethyleneether glycol to diisocyanate greater than 1:1 in order to have a polyurethane with —OH end groups.

The formulations of the elastomer and the polyurethane plasticizer of this invention are made in conventional rubber processing equipment such as rubber roll mills or Banbury mixers. The elastomer is first put on the mill and milled to give a good rolling bank and then the plasticizer is added and milled in uniformly. Other compounding ingredients such as carbon black are then added. The order of addition is not critical and may be varied as desired. The diisocyanate curing agent is added last. After thorough milling, the compounded stock is ready for shaping in any desired manner and curing may be effected in the customary way by applying heat and pressure. Pressure is not essential for the curing step.

Since the plasticizer has free hydroxyl groups on its ends, the diisocyanate curing agent presumably reacts with them as well as with the elastomer during the curing step. This makes the polyurethane plasticizer an integral part of the cured elastomer.

The amount of plasticizer used ranges from 3–40 parts par 100 parts of elastomer. The actual amount will vary depending on the nature and scorchiness of the particular elastomer being compounded. Less than about 3 parts per 100 does not give sufficient improvement in the scorch properties to be useful, while more than about 40 parts per 100 does not show any added improvement. Greater amounts also begin to exert their influence on the nature of the cured elastomer since such amounts comprise a very significant portion of the whole elastomer. Generally speaking, it is undesirable to so alter the properties of the cured elastomer.

The elastomers which may be cured according to this invention include those which are prepared from polyalkylene ether glycols, diisocyanates and chain-extending agents, as disclosed and claimed in pending application Serial No. 365,270 of Hill, filed June 30, 1953. The term "polyalkylene ether glycol" refers to a polyalkylene ether which contains terminal hydroxy groups. These compounds are derived from the polymerization of cyclic ethers such as alkylene oxides or dioxolane or from the condensation of glycols. They are sometimes known as polyalkylene glycols or polyalkylene oxide glycols. Those useful in preparing the uncured polyurethane reaction product may be represented by the formula HO(RO)$_n$H, in which R stands for an alkylene radical and $n$ is an integer sufficiently large that the molecular weight of the compound is at least 750, i. e., large enough that the polyoxyalkylene group —(RO)$_n$— has a formula weight of at least 732. Not all of the alkylene radicals present need be the same. Glycols containing a mixture of radicals, as in the compound HO(CH$_2$OC$_2$H$_4$O)$_n$H can be used. These glycols are either viscous liquids or waxy solids. To be of value in preparing elastomers, the molecular weight of the glycol should be at least 750 and may be as high as 10,000. It is preferably between 750 and 3,500. Polytetramethyleneether glycol, also known as polybutylene ether glycol, is the preferred glycol. Polyethylene ether glycol, polypropylene ether glycol and poly-1,2-dimethylethylene ether glycol are representative of other operable compounds.

Any of a wide variety of diisocyanates may be used in the polymerization to prepare the uncured polyurethane elastomers. Aromatic diisocyanates, such as 2,4-tolylene diisocyanate, 4,4'-methylene-bis(phenyl isocyanate), 1,5-naphthylene diisocyanate and m-phenylene diisocyanate, are preferred. Aliphatic compounds such as hexamethylene diisocyanate and tetramethylene diisocyanate, and the alicyclic compounds such as 1,4-cyclohexylene diisocyanates are also operable.

The chain-extending agent contains a plurality of active hydrogen atoms, no more than two atoms in the molecule having active hydrogen attached thereto. It is preferably water. By "active hydrogen atoms" is meant those hydrogen atoms which display activity according to the well-known Zerewitinoff test as described in Kohler in J. Am. Chem. 49, 3181 (1927). When water is employed as the chain extender, it is capable of reacting with two isocyanate groups with the evolution of carbon dioxide to form a urea group linking the polymer fragments to which the isocyanate groups were attached. Urea linkages are also formed if a diamine such as 2,4-tolylenediamine or ethylene diamine is used as the chain-extending agent. Other useful chain extenders include ethylene glycol, adipamide, p-aminobenzoic acid, monoethanolamine, 1,4 - cyclohexanedisulfonamide, succinic acid, and hydroxypropionic acid.

In the preparation of the uncured elastomer, an excess of the diisocyanate over the polyalkylene ether glycol is used, which may be only a slight excess or may be up to 12:1 molar ratio. The glycol and the diisocyanate are ordinarily reacted by heating with agitation at a temperature of between 70 and 120° C. The chain-extending agent is then added and heating and mixing are continued at about 80 to 100° C. During this period the molecular weight of the reaction product increases and the mass gradually forms rubbery chunks. It is then removed from the mixer and sheeted out on a rubber mill. If the reaction product is to be stored prior to the addition of the diisocyanate processing additive and curing agent, it is then necessary to stabilize it by adding some material such as primary or secondary nitrogen base in amount sufficient to react with the remaining free isocyanate groups, as disclosed and claimed in application Serial No. 379,291 of Nelson et al., filed September 9, 1953. This stabilized polymer and the self-stabilized polymer which results when enough glycol and chain-extending agent have been used to tie up all the isocyanate groups may be stored for considerable periods without losing their ability to form a smooth band when milled on a rubber mill.

Instead of the hydrocarbon portion of the polyether glycols used in forming these products being entirely alkylene, the compound can contain arylene or cycloalkylene radicals together with the alkylene radicals, as, for example, in the condensation product of a polyalkylene ether glycol with $\alpha,\alpha'$-dibromo-p-xylene in the presence of alkali. In such products, the cyclic groups inserted in the polyether chain are preferably phenylene, naphthylene or cyclohexylene radicals or these radicals containing alkyl substituents. Elastomers made using polyalkylene-arylene or polyalkylene-cycloalkylene ether glycols have improved freeze resistance as compared with the corresponding elastomers containing no cyclic radicals.

Another class of glycols for making curable polyurethanes useful in this invention are the polyether-polythioether glycols. Such glycols may be represented by the formula HO(QY)$_n$H in which Q represents hydrocarbon radicals, at least some of which are alkylene, Y represents chalcogen atoms, some of which are sulfur and the rest oxygen, and $n$ is an integer large enough so that the glycol has a molecular weight of at least 750. These products may be made by condensing together glycols and thioglycols in the presence of a catalyst such as p-toluene sulfonic acid.

Elastomers which are similar to those formed from the reaction between long chain glycols of the types mentioned above, diisocyanates and water may be made from the reaction of a high molecular weight organic bis-chloroformate, an organic diamine and phosgene, as described and claimed in pending application Serial No. 461,657 of Carter et al., filed October 11, 1954. These products may be cured advantageously by the process of this invention.

The organic diisocyanate curing agents which are useful in the process of the present invention and which are added subsequent to the addition of the polyurethane plasticizer include such compounds as 1,3-bis(3-isocyanato-p-tolyl)urea, 4,4'-methylene di-o-tolylisocyanate, 2,4-tolylene diisocyanate, the dimer of 2,4-tolylene diisocyanate, 4-tertiary-buyl-m-phenylene diisocyanate, 4-methoxy-m-phenylene diisocyanate, 4-propyloxy-m-phenylene diisocyanate, 4-chloro-m-phenylene diisocyanate, 4-bromo-m-phenylene diisocyanate and 4-phenoxy-m-phenylene diisocyanate. The amount of diisocyanate curing agent which is subsequently added to the plasticized elastomer should range from about 1 to 20 parts per 100 parts of elastomer. To effect curing, the resulting mixture of elastomer, plasticizer and curing agent should be heated to a temperature of between about 90 and 150° C.

The following tests are used to judge the effectiveness of the polyurethane plasticizers of this invention in improving the scorch resistance of polyurethane elastomers.

100° C. OR 130° C. MILL SCORCH TEST

10–12 g. of the compounded elastomer (including the diisocyanate curing agent) is put on a 2 x 6 inch rubber mill at about 30° C. and milling is started. The mill-roll temperature is then raised to 100° C. and held there for the 100° C. scorch test. For the 130° C. test, the temperature is raised, after about 2 minutes at 100° C. to 130° C. and held there. After the required temperature is reached, milling is continued until the sample scorches, or the test is discontinued because the sample does not scorch within a given time. Scorch is indicated by the appearance of holes in the band on the roll, the loss of tack and the appearance of a dry, crumbly bank on the rolls. In the case of severe and rapid scorch, the polymer may crumble and fall off the mill. The scorch resistance is measured in terms of minutes from the time that the roll reaches the required temperature to the time scorching begins.

MOONEY SCORCH TEST

This is the standard Mooney scorch test described in "ASTM Standards on Rubber Products," published by the American Society for Testing Materials and is designated D 1077–49 T. This test measures the change in viscosity of the curable mixture resulting from heating at a specific temperature as a function of time. In these tests the small rotor is used at a temperature of 100° C. and the aging period for the stock is omitted.

EXTRUDER SCORCH TEST

This test is carried out by extruding the compounded stock under conditions simulating those used in extruding tire tread stock in the rubber industry. The compounded stock is fed into an extruder and the stock emerging from the die of the extruder is recycled back to the feed of the extruder. In this way the stock is continuously extruded until it scorches. Scorching is indicated by roughness and tearing of the stock emerging from the die and, in cases of severe scorch, refusal of the stock to extrude at all. Contrariwise, a non-scorchy stock will emerge as a smooth shiny strip with good definition of the die. The scorch resistance is measured in terms of minutes of extrusion without scorch.

The following examples will better illustrate the nature of the invention. However, the invention is not intended to be limited to these examples. Parts are by weight unless otherwise indicated.

Example 1

*A. Preparation of polyurethane plasticizer.*—2325 parts of polyetetramethyleneether glycol, having a molecular weight of about 930, and 391 parts of 2,4-tolylene diisocyanate are stirred together for 2 hours during which time the temperature is gradually raised from 100° C. to 130° C. by the end of the first hour and to 155° C. by the end of the second. It is a very viscous, sticky material which shows a negative isocyanate test.

*B. Preparation of elastomer.*—180 parts of polytetramethyleneether glycol, having a molecular weight of about 935 and containing about 0.01% water, and 22.27 parts of 2,4-tolylene diisocyanate are mixed together in a Werner-Pfleiderer mixer at 100–105° C. for 3 hours. The viscous mass is cooled to 70–75° C. and 0.36 part of water is added and mixed in for 15 minutes. Then 25.75 parts of 2,4-tolylene diisocyanate is added and mixing is continued an additional 2 hours at 70–75° C. 8.1 parts of water is then added and mixing is continued for 20 minutes while the temperature rises from 70° C. to 100° C. The rubbery polymer is promptly removed from the mixer and milled on a rubber mill while 0.5 part of piperidine per 100 parts of polymer is milled in to stabilize it.

*C. Preparation of plasticized elastomer.*—The following formulations are compounded on a rubber mill:

|  | I | II |
|---|---|---|
| Elastomer prepared in 1-B above | 85 | 85 |
| Polyurethane plasticizer prepared in 1-A above |  | 15 |
| Conductive channel black | 15 | 15 |
| 1,3-bis(3-isocyanato-4-methylphenyl)urea added as a curing agent | 7 | 7 |

The formulations are milled on the rubber mill for 5 minutes at 60° C., 2 minutes at 70° C., 2 minutes at 80° C., and 2 minutes at 90° C. When milled at 130° C., II gives a good rolling bank and is not scorching at the end of 40 minutes, while I shows signs of scorching after about 20 minutes.

Example 2

*A.*—The polyurethane plasticizer of Example 1-A is used.

*B. Preparation of elastomer.*—465 parts of polytetramethyleneether glycol, having a molecular weight of about 930, 6.4 parts of water, 0.54 part phosphoric acid (85% H₃PO₄) and 116.5 parts of 2,4-tolylene diisocyanate are mixed in a Werner Pfleiderer mixer for 45 minutes at 70° C., for 45 minutes while increasing the temperature from 70° C. to 130° C., and for 90 minutes at 130–135° C. The soft polymer remains mixable in the blades of the mixer. It is removed from the mixer.

*C. Preparation of plasticized elastomers.*—The following formulations are made on a rubber mill:

|  | A | B |
|---|---|---|
| Elastomer prepared in 2-B above | 40 | 30 |
| Polyurethane plasticizer prepared in 2-A above |  | 10 |
| Conductive channel black | 8 | 8 |
| 1,3-bis(3-isocyanato-4-methylphenyl)urea added as a curing agent | 2 | 2 |

Mooney scorch tests were then run on the two samples at 100° C. according to ASTM Method D 1077–49 T, using the small rotor.

|  | I | II |
|---|---|---|
| Initial reading | 118 | 84 |
| Low point (4 minutes) | 64 | 37 |
| Minutes to 10 point rise | 10 | 17 |

It is readily apparent that the scorch characteristics of the elastomer has been very markedly improved by the addition of the polyurethane plasticizer. It is to be noted that in addition to the low point reading of II being only about 60% of I, the time required for a 10 point rise is 70% longer. This combination, of course, means that the time required for II to reach equal viscosity is about four times as long as for I.

Example 3

*A. Preparation of polyurethane plasticizer.*—500 parts of polytetramethyleneether glycol, having a molecular weight of about 2420, and 32.5 parts of 2,4-tolylene diisocyanate are mixed together in a Werner-Pfleiderer mixer at 125–130° C. for 6 hours. The resulting polyurethane is a sticky, taffy-like mass with an intrinsic viscosity of 0.72. The molar ratio of glycol to diisocyanate is 8:7.

*B. Preparation of elastomer.*—1300 parts of polytetramethyleneether glycol, having a molecular weight of about 2420, and 115 parts of 2,4-tolylene diisocyanate are mixed in a Werner-Pfleiderer mixer at 120–130° C. for 6 hours. There is then added 22.4 parts of m-tolylene diamine and the mixing is continued for an additional 1 hour at 120–130° C. The resulting tacky rubber is mixable and remains within the blades of the mixer. It is discharged and milled on a rubber mill and sheeted off.

*C. Preparation of plasticized elastomer.*—The following formulations are made up on a rubber mill:

|  | I | II |
|---|---|---|
| Elastomer prepared in 3-B above | 100 | 75 |
| Polyurethane plasticizer prepared in 3-A above |  | 25 |
| Conductive channel black | 30 | 30 |
| 4-methoxy-m-phenylene diisocyanate added as a curing agent | 3 | 3 |

Each of these compositions is subjected to the mill scorch test at 130° C. I shows scorch in 1–2 minutes and II shows scorch in 20 minutes.

Example 4

*A. Preparation of polyurethane plasticizer.*—950 parts of polytetramethyleneether glycol, having a molecular weight of about 910 and containing 0.02% water, and 121.5 parts of 2,4-tolylene diisocyanate are stirred together in an agitated vessel at 100° C. for 3 hours. The resulting polyurethane is a viscous mass, showing no —NCO groups by analysis and having a calculated molecular weight of 3080.

B. *Preparation of elastomer.*—2775 parts of polytetramethyleneether glycol, having a molecular weight of about 925, and 351.5 parts of 2,4-tolylene diisocyanate are mixed together at 100–105° C. for 3 hours in an agitated vessel. 200 parts of the resulting polyurethane and 0.36 part of water are mixed together in a Werner-Pfleiderer mixer for 15 minutes and then 23.3 parts of 2,4-tolylene diisocyanate are added and mixing is carried on for 2 hours at 70–75° C. 8.06 parts of water is then added and mixing is continued for 20 minutes while the temperature rises from 70° C. to 100° C. The product is now in the form of rubbery chunks. It is transferred immediately to a rubber mill and milled while 0.18 part of piperidine per 100 parts of polymer is added to stabilize the elastomer.

C. *Preparation of plasticized elastomer.*—The following two formulations are compounded on a rubber mill:

|  | I | II |
|---|---|---|
| Elastomer prepared in 4–B above | 100 | 100 |
| Polyurethane plasticizer prepared in 4–A above |  | 15 |
| Easy processing channel black | 15 | 15 |
| 1,3-bis(3-isocyanato-4-methylphenyl)urea added as a curing agent | 8 | 8 |

These two products are then given the Mooney scorch test at 100° C., small rotor, with the following results:

|  | I | II |
|---|---|---|
| Low reading | 81 | 57 |
| Minutes to 10 point rise | 13 | 21 |

It is obvious that the scorch safety of sample II is much greater than I, since even after the 10 point rise the viscosity of II is still 14 points below the low reading of I.

*Example 5*

A. *Preparation of polyurethane plasticizer.*—950 parts of polytetramethyleneether glycol, having a molecular weight of about 945 and containing 0.02% water, and 117.5 parts of 2,4-tolylene diisocyanate are stirred together in an agitated vessel at 100–105° C. for 3 hours. The resulting polyurethane is a viscous mass, showing no —NCO groups by analysis and having a calculated molecular weight of 3180.

B.—The elastomer of Example 4–B is used.

C. *Preparation of plasticized elastomer.*—The following formulations are milled together on a 30-inch rubber mill:

|  | I | II |
|---|---|---|
| Elastomer prepared in 5–B above g | 9,072 | 9,072 |
| Polyurethane plasticizer prepared in 5–A above g |  | 1,361 |
| High abrasion furnace black g | 1,361 | 1,361 |
| 1,3-bis(3-isocyanato-4-methylphenyl)urea added as a curing agent g | 726 | 726 |

The elastomer is milled for 5 minutes on the mill, with cold water cooling on the rolls (elastomer temperature 125° C.), the black is then added and milled in for 5 minutes (elastomer temperature 125° C.), the polyurethane plasticizer is added (in II) and milling is continued 5 minutes (temperature 110–115° C.), the curing agent is then added and milled 8 minutes (temperature 105° C.). After a further 3–4 minutes blending the elastomer is fed to the extruder at 110° C.

The samples are tested by extruding them thru a rubber extruder which gives a flat strip which is used for the tread cap in recapped tires. The extruder is a Royle No. 4 which has a 6-inch screw or worm which turns at 18 R. P. M. The worm, barrel, and head are heated to 94–95° C. with steam before starting to feed the elastomer to the extruder. As soon as the stock starts to emerge from the head, cooling water is turned on the barrel and the worm, but the head is kept at 94–95° C.

In the test, the elastomer stock is fed from the rubber mill into the extruder and as it comes from the extruder it is fed back into the extruder. The recycling is continued until scorching occurs. The residence time in the extruder is about 4 minutes and about 1 minute lapses between the time the stock emerges from the head until it is fed back into the extruder, thus giving a 5-minute recycle rate. There is very little temperature drop during the 1 minute outside the extruder.

In the case of I, the stock scorched as it passed thru the extruder the first time and it was impossible to take a strip out of the head. In the case of II scorching began only after about 30 minutes of recycling. The strip was smooth and showed excellent conformation to the design of the die in the head.

*Example 6*

A.—The polyurethane plasticizer of Example 5–A is used.

B. *Preparation of elastomer.*—950 parts of polytetramethyleneether glycol, having a molecular weight of about 935, and 120.5 parts of 2,4-tolylene diisocyanate are stirred together at 100–105° C. for 3 hours. 200 parts of the resulting polyurethane are put in a Werner-Pfleiderer mixer with 0.36 part of water and mixed 15 minutes at 70–75° C. Then 23.2 parts of 2,4-tolylene diisocyanate is added and mixing is continued for 2 hours at 70–75° C. Then 8 parts of water is added and mixing continued for 19 minutes, the temperature rising from 70° C. to 98° C. The rubbery mass is promptly removed from the mixer and sheeted out on a rubber mill where 0.21 part of piperidine is incorporated for each 100 parts of elastomer.

C. *Preparation of plasticized elastomer.*—100 parts of the elastomer is put on a 6 x 2 inch rubber mill and milled for 10 minutes at 100° C. Then 5 parts of the polyurethane plasticizer from A above is milled in and then 8 parts of 1,3-bis(3-isocyanato-4-methylphenyl)urea. Another sample is prepared similarly as a control without the addition of the polyurethane plasticizer.

The two samples are compared for scorch characteristics by the Mooney procedure at 100° C. using the small rotor. The low reading for the control sample is 62 and 33 minutes are required for the viscosity to rise to 72 (10 points). The plasticized sample has a low reading of 53 and 47 minutes are required for the rise to 72. The processing safety, as regards scorch, is thus extended some 50%.

*Example 7*

A. *Preparation of polyurethane plasticizer.*—465 parts of polytetramethyleneether glycol, having a molecular weight of about 930 and containing 0.005% water, and 82.8 parts of 2,4-tolylene diisocyanate are mixed in a Werner-Pfleiderer mixer at 130–135° C. for 6 hours. The resulting polyurethane is taffy-like when hot and a plastic solid when cold.

B.—The elastomer of Example 6–B is used.

C. *Preparation of plasticized elastomer.*—100 parts of the elastomer is milled on a 2 x 6 inch rubber mill at 100° C. for 10 minutes and then 10 parts of the polyurethane plasticizer from A above is milled in. Finally 8 parts of 1,3-bis(3-isocyanato-4-methylphenyl)urea is milled in. A control sample is made up without the polyurethane plasticizer.

Both samples are then subjected to scorch resistance by the Mooney method at 100° C. using the small rotor.

The control shows a low reading of 62 which rises to 72 (10 point rise) in 33 minutes. The plasticized sample shows a low reading of 55 and 55 minutes are required for the viscosity to rise to the same point (72) as the control.

It is quite apparent from the preceding description that the polyurethane plasticizers of the present invention are highly compatible with polyurethane elastomers and greatly improve the scorch resistance of these elastomers.

The cured elastomers prepared according to the present process may be used for the same purposes as other elastomers. From them may be prepared such articles as tires, inner tubes, belts, hose and tubes, wire and cable jackets, footwear, sponge, coated fabric and various other molded or dipped articles.

The basic elastomeric properties of these products may be varied by suitable compounding. The type and amount of the compounding agent to be used is dependent upon the use for which the elastomer is intended. Some of the more important compounding agents which are of value with these elastomers are carbon black, clay, silica, esterified silica particles (estersils), talc, zinc, calcium and magnesium oxides, titanium dioxide and plasticizers. Inorganic and organic coloring agents may be incorporated to give well defined colored products. The natural color of the elastomer is a pale yellow or a light amber.

The compounding agents may be mixed or incorporated with the product at the same time the diisocyanate curing agents are added. Conventional rubber processing machinery such as rubber mills and Werner-Pfleiderer or Banbury mixers may be used. The resulting compounded stocks may be shaped or cured in conventional rubber industry equipment. Alternatively, the stocks may be dissolved or extended with solvents for application to surfaces upon which they may be cured after evaporation of the solvent.

As many widely different embodiments of this invention may be made without departing from the spirit and scope thereof, it is to be understood that this invention is not limited to the specific embodiments thereof except as defined in the appended claims.

What is claimed is:

1. In the process of curing a stable, uncured polyurethane polymer which contains substantially no free isocyanate groups by incorporating therewith from 1 to 20% by weight of an organic diisocyanate curing agent to cross-link said uncured polyurethane polymer, and heating the mixture to a temperature of between about 90 and 150° C. until a cured elastomer is formed, the step which comprises incorporating therewith, prior to the addition of the curing agent, from 3 to 40% by weight of a plasticizer prepared by the reaction of a polytetramethyleneether glycol having a molecular weight of from 750 to about 3000 with 2,4-tolylene diisocyanate, with the molar ratio of glycol to diisocyanate being between about 2:1 and 20:19.

2. The plasticized elastomers obtained by the process of claim 1.

3. The process of claim 1 in which the uncured polyurethane polymer is prepared by the reaction of a polytetramethyleneether glycol having a molecular weight of from 750 to about 10,000, an organic diisocyanate and a chain extending agent selected from the group consisting of water, organic diamines, organic glycols, organic dicarboxylic acids, and organic amino alcohols.

4. The process of claim 3 in which the organic diisocyanate is 2,4-tolylene diisocyanate.

5. The process of claim 4 in which the chain extending agent is an organic diamine.

6. The process of claim 4 in which the chain extending agent is water.

7. The process of preparing a cured, stable reaction product of a polytetramethyleneether glycol having a molecular weight of from 750 to about 10,000, a molar excess of 2,4-tolylene diisocyanate, and water, said reaction product containing substantially no free isocyanate groups, which comprises incorporating therewith from 3 to 40% by weight of a reaction product of a polytetramethyleneether glycol having a molecular weight of from 750 to 3000 and 2,4-tolylene diisocyanate in a molar ratio of glycol to diisocyanate between about 2:1 and 20:19, thereafter incorporating therewith from 1 to 20% by weight of 1,3-bis(3-isocyanato-p-tolyl)urea and heating the mixture at a temperature between about 90 and 150° C. to produce a cured elastomer.

8. The cured elastomers obtained by the process of claim 7.

References Cited in the file of this patent

UNITED STATES PATENTS 2,729,618      Muller et al.             Jan. 3, 1956